United States Patent [19]

Mathur

[11] Patent Number: 4,507,335
[45] Date of Patent: Mar. 26, 1985

[54] METHOD AND APPARATUS FOR PELLETIZING SULPHUR

[75] Inventor: Krishna S. Mathur, Calgary, Canada

[73] Assignee: Procor Limited, Alberta, Canada

[21] Appl. No.: 579,686

[22] Filed: Feb. 13, 1984

[51] Int. Cl.³ .......................... B05D 7/00; B22F 3/00
[52] U.S. Cl. ................................... 427/215; 118/303; 264/7; 264/8; 425/222; 427/242; 427/424
[58] Field of Search ................. 425/222; 118/303, 19; 427/242, 215, 424; 264/5, 7, 8

[56] References Cited

U.S. PATENT DOCUMENTS

| | | | |
|---|---|---|---|
| 4,213,924 | 7/1980 | Shirley | 264/7 |
| 4,234,318 | 11/1980 | Higgins et al. | 427/215 X |
| 4,272,234 | 6/1981 | Tse | 425/222 |
| 4,424,176 | 1/1984 | Shirley et al. | 264/7 |

Primary Examiner—Michael R. Lusignan
Attorney, Agent, or Firm—Dressler, Goldsmith, Shore, Sutker & Milnamow, Ltd.

[57] ABSTRACT

A method and apparatus for continuously generating sulphur seed nuclei inside the drum of a sulphur pelletizing system. The sulphur seed nuclei are generated in portions of the drum by elevating the temperature of the solid sulphur particles in the range of about 180° to 230° F. A portion of the sprayed liquid sulphur particles solidify into seed nuclei particles prior to contacting a falling curtain of solid sulphur particles in the area of the spray pattern having a minimum density of the liquid sulphur particles. The generation of seed nuclei may be confined to the feed end of the drum so as to leave the remaining portion of the drum available for product growth.

22 Claims, 4 Drawing Figures

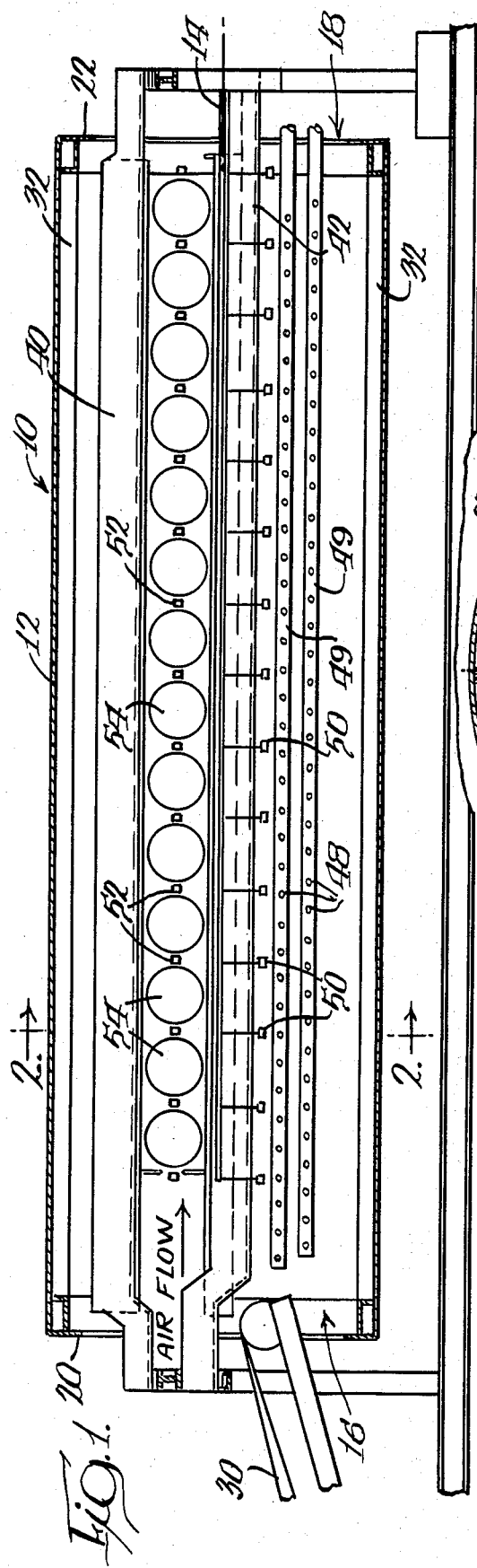
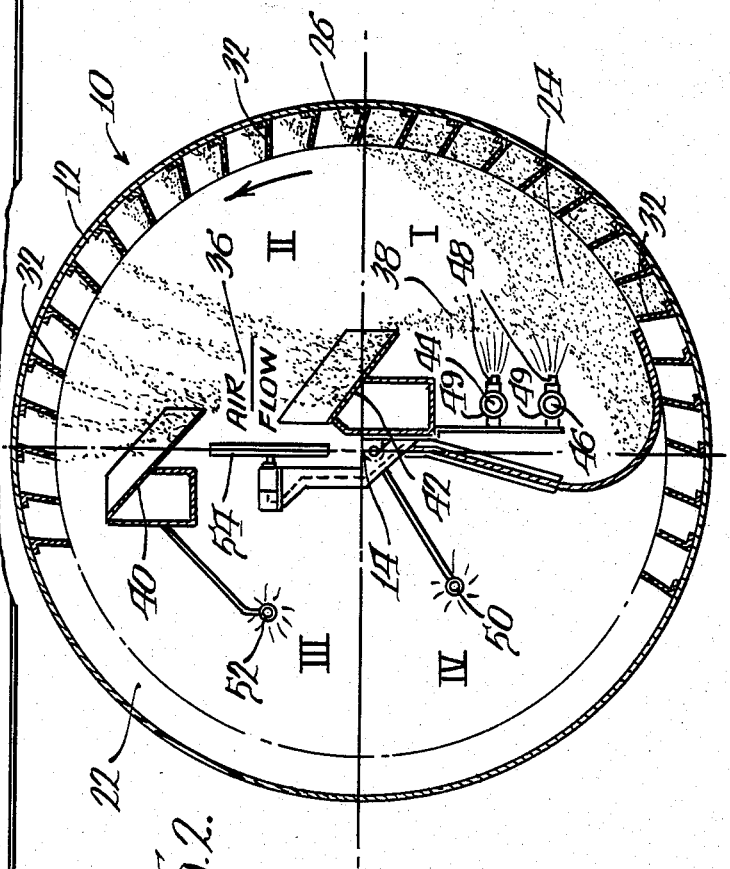

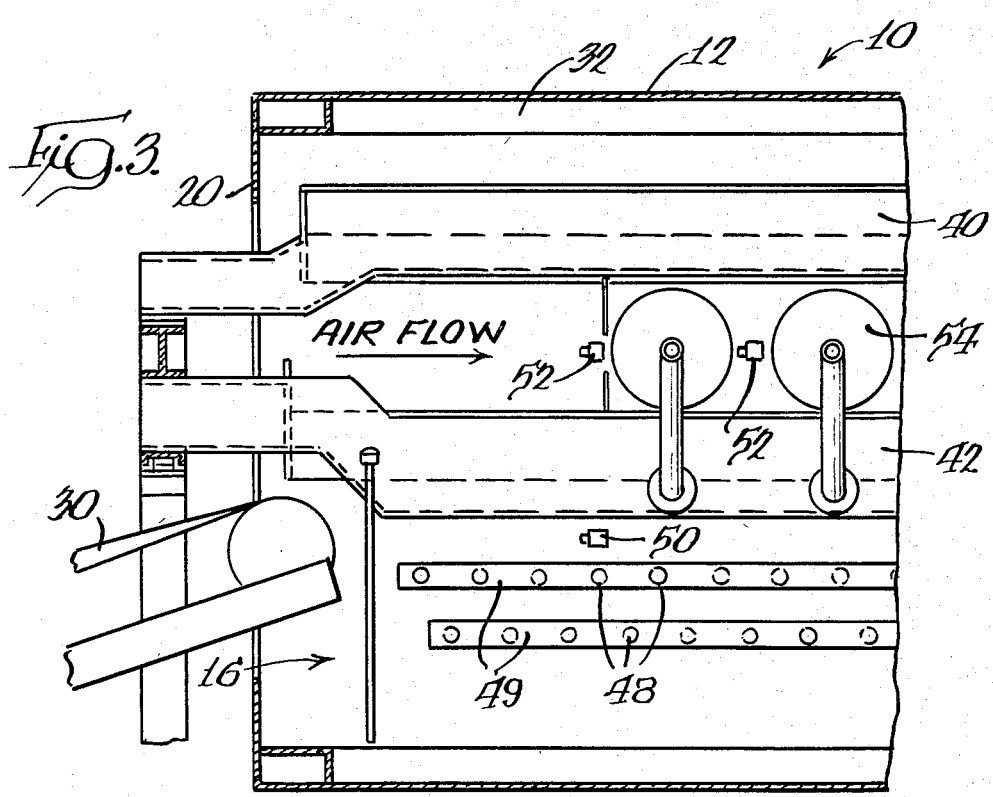
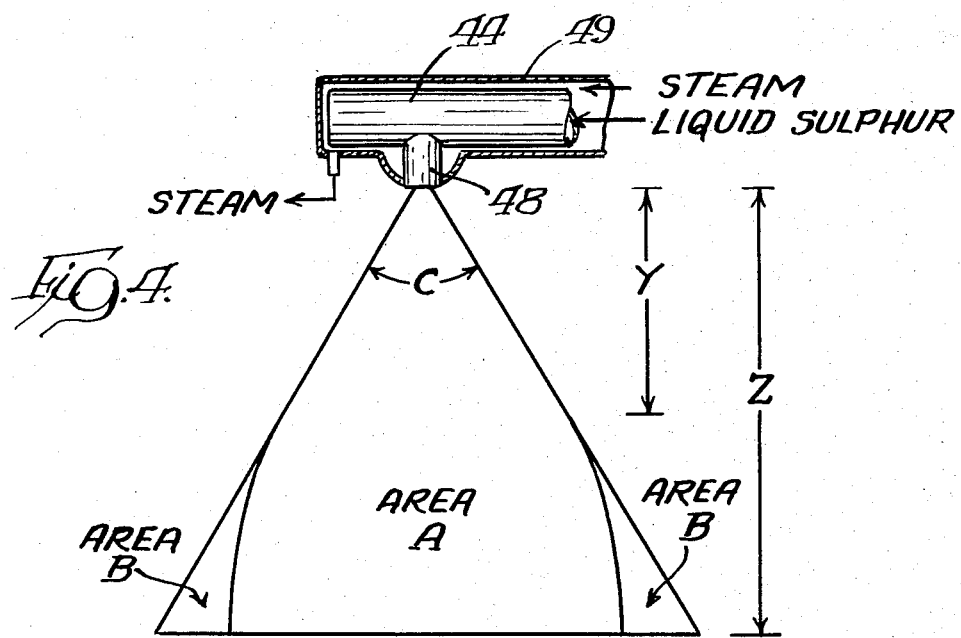

METHOD AND APPARATUS FOR PELLETIZING SULPHUR

BACKGROUND OF THE INVENTION

This invention relates to an improved method and apparatus for producing relatively small sulphur pellets in a continuous process. More specifically the invention relates to a method and apparatus for continuously generating sulphur seed particles within the sulphur pelletizing drum.

As exemplified in U.S. Pat. No. 4,272,234 and Canadian Pat. No. 1,148,726, both assigned to the same assignee as the present invention, it is known to produce sulphur pellets by spraying molten sulphur onto a curtain of falling solid sulphur particles to coat and increase the diameter of the particles into product size pellets. Although the method and apparatus disclosed in these patents has been commercially successful, the method and apparatus of the present invention incorporate various design changes which increase the productivity of the system and decrease the cost of the system.

As disclosed in these patents, the heretofore known system includes a rotating drum which rotates a bed of solid sulphur particles. The bed of solid sulphur particles is caused to be elevated by flights associated with the inner surface of the drum so as to cause the solid sulphur particles to descend in a curtain onto the bed. The drum has a pair of deflector plates extending lengthwise of the drum for deflecting the descending solid sulphur particles into two separated, distinct, generally continuous curtains which fall onto the bed at spaced locations. A series of sulphur spray nozzles are spaced longitudinally of the drum beneath one of the deflector plates to spray atomized liquid sulphur particles onto one of the curtains at a pressure in the range of about 200-500 p.s.i. and a temperature above 260° F. The liquid sulphur coats the solid sulphur particles in the curtain of particles to increase the particles in size as they migrate from the feed end of the drum towards the discharge end of the drum.

It is recognized in these patents that it is necessary to maintain the temperature of the bed in the range of about 120° to 180° F. for production of quality pellets resulting from solidification of the liquid sulphur sprayed onto the particles. In order to so maintain the temperature of the bed, a series of longitudinally spaced humidification nozzles are positioned underneath the other deflector plate to spray an atomized liquid onto the second curtain of particles. By so doing, the temperature of the bed is maintained in the range of about 120° to 180° F. Ambient air is drawn through the drum countercurrent to the direction of movement of the bed.

In the heretofore art of sulphur granulation or pelletizing, the temperature of the solid sulphur particles inside the drum was maintained between 120° to 180° F. as a general rule. These temperatures were not high enough to evaporate the water sprayed in the drum. The moist or wet granules being at a temperature lower than the boiling point of water (212° F.) did not evaporate the moisture on the sulphur particles fast enough. Thus, the moist sulphur particles in contact with the small seed nuclei particles had an adverse effect, in that the seed particles stuck to the granules and thereby created an even higher and unpredictable demand for seed particles.

In order to keep the system operating continuously the full sized sulphur pellets which are removed from the system must be replaced with seed nuclei solid sulphur particles. It has heretofore been the practice to supply such seed particles to the drum from an outside source; namely a crusher which crushes oversize particles into seed size particles.

As disclosed in the above identified patents, a method was devised to attempt to generate seed particles within the drum. The seed particles are produced within the drum by intermittently raising the temperature of the bed of solid sulphur particles by at least 40° F. for brief periods. When the temperature of the bed is raised to the range of about 160°-220° F., the liquid sulphur sprayed on the falling curtain of solid sulphur particles does not completely solidify immediately and the sprayed sulphur coating remains slightly soft or plastic on the surface of the particles. As the solid sulphur particles with this plastic coating are tumbled in the bed, the abrading action of the other particles rub or break off small pieces of this soft coating having a diameter in the size range of about 0.1 to 1.0 m.m. After the broken-off pieces solidify, they become the seed nuclei of the system. The temperature of the bed is so raised for approximately 2% of the time to produce the seed particles. It has been found that this method of seed particle production, though feasible, was a cumbersome process from an operational viewpoint. Fluctuating ambient temperatures and changing production rates make use of this method most difficult. Accordingly, it was deemed necessary to develop an improved method of generating seed nuclei particles within the drum on a continuous basis.

Various work has been done by the National Fertilizer Development Center of Tennessee Valley Authority, U.S.A., in the development of urea granulation methods and apparatus. An example of such work is disclosed in U.S. Pat. No. 4,213,924. Reference is made to the discussion in this patent of various prior granulation processes in which seed particles are charged into the bed formed in a rotary drum to produce product size particles. A more recent development by the Tennessee Valley Authority is disclosed in U.S. Pat. No. 4,424,176. The granulation processes referred to above do not contemplate the formulation of seed nuclei particles on a continuous basis within the granulation drum.

SUMMARY OF THE INVENTION

In accordance with the preferred method of the invention, a supply of sulphur seed nuclei particles is generated inside the granulating drum on a continuous controlled basis. It has been discovered that the sulphur seed nuclei particles can be generated in portions of the drum by elevating the temperature of the solid sulphur particles bed and/or falling curtain of solid sulphur particles within a specified range of about 180° to 230° F. It has been discovered that under certain controlled operating conditions a portion of the sprayed liquid sulphur particles solidifies into seed nuclei particles prior to contacting the falling curtain of solid sulphur particles in the area of the spray pattern having a minimum density of the liquid sulphur particles. In so doing, the generation of seed nuclei particles is confined to a localized confined area of the drum, leaving the remaining area of the drum available for the growth of product size sulphur pellets.

It has been discovered that a number of operating parameters determine the quantity of seed nuclei generation. In accordance with the method of the present invention, the quantity of seed generation within the drum may be controlled to match changing product rates of the system. Accordingly, by changing one or a combination of operational variables at a given rate and/or time the generation of seed nuclei on a continuous basis can be matched to the required production rate. An identification and discussion of these variables will hereinbelow be discussed in further detail.

The apparatus in accordance with a preferred embodiment of the invention includes an elongated, rotatable, generally cylindrical drum having an axis of rotation inclined slightly with respect to the horizontal from a feed end to a discharge end, whereby rotation of the drum causes solid sulphur particles forming a bed therein to move from the feed end toward the discharge end. The inside surface of the drum has a plurality of inwardly extending lifting flights, whereby rotation of the drum causes the flights to lift solid sulphur particles from the bed to an upper zone in the drum and to then drop the particles so that a curtain of solid sulphur particles fall toward the bed. A longitudinally extending inclined, upper collecting pan is supported in an upper center area of the drum to receive and direct solid sulphur particles dropping from the flights in the form of a falling curtain onto an upper area of a longitudinally extending, inclined, lower collecting pan supported below the upper collecting pan. The lower collecting pan may also receive solid sulphur particles dropping directly from the flights. The solid sulphur particles from the lower pan are directed in the form of a falling curtain onto the bed.

The respective ends of the drum are open to direct air through the drum. The general direction of air movement through the drum is preferably co-current with the direction of movement of the bed through the drum. A plurality of longitudinally spaced fans are supported within the drum in facing relation to the curtain of falling solid sulphur particles from the upper pan toward the lower pan to internally direct humidified air onto such curtain to remove heat therefrom.

A series of longitudinally spaced liquid sulphur spray nozzles are supported within the drum spaced from and in facing relation to the curtain of solid sulphur particles cascading off the lower pan for spraying liquid sulphur particles onto such curtain. The positioning and design of these nozzles are relevant to the generation of sulphur seed nuclei within the drum.

A plurality of liquid spray nozzles are supported within an area of the drum behind the upper and lower pans to spray an atomized cooling liquid into the drum. The cooling liquid mixes with the air circulating through to form humid air which serves to reduce the temperature of the solid sulphur particles. The internal fans direct this humid air directly onto the curtain of solid sulphur particles cascading from the upper pan. The humid air is also utilized to control the temperature of certain portions of the bed in a manner, as will further be discussed hereinbelow, to generate sulphur seed nuclei within the drum. The humid air in the vicinity of the liquid sulphur cools a fine mist portion of the sulphur spray pattern generated from the sulphur spray nozzles to solidify same into solid particles, which drop out as the sulphur seed nuclei.

DESCRIPTION OF THE DRAWING

FIG. 1 is a schematic, partially cross-sectional side view of a sulphur pelletizing system in accordance with the invention.

FIG. 2 is an enlarged cross-sectional view taken along line 2—2 in FIG. 1.

FIG. 3 is an enlarged schematic, partially cross-sectional, side view of the feed end of the system illustrated in FIG. 1.

FIG. 4 is a schematic representation of the side and end views of a sulphur spray pattern from one of the liquid sulphur spray nozzles.

DESCRIPTION OF THE INVENTION

Referring to FIGS. 1-3, a sulphur pelletizing system in accordance with the present invention is indicated generally at 10. System 10 includes an open-ended, elongated hollow, cylindrical rotatable drum 12 having a central axis 14 inclined slightly (i.e. less than 2°) with respect to a horizontal plane from its entrance or feed end 16 to its exit or discharge end 18. Feed end 16 is partially closed by an annular ring 20 and discharge end 18 is partially closed by a similar ring 22. A bed 24 of solid sulphur particles tumbles in the bottom of drum 12 as the drum is rotated around its axis of rotation 14 by conventional means (not illustrated). As drum 12 rotates, one elongated edge 26 of bed 24 is elevated above the other elongated edge 28. The solid sulphur particles in bed 24 range in size from microscopic dust particles to the full sized, generally spherical pellets having a predetermined diameter in the range of about 2 to 20 m.m., that are the end product of the system. The solid sulphur particles in bed 24 gradually move from the feed end 16 to the discharge end 18 as drum 12 rotates, and then fall over the small discharge end ring 22 and out of drum 12 onto a sizing screen having openings of a predetermined size (not illustrated). Pellets having a diameter larger than the holes in the screen are suitably directed into a product hopper or storage silo (not illustrated). Particles that fall through the holes in the screen are suitably directed to a conventional conveyor means 30 and back into the feed end 16 of drum 12.

Drum 12 rotates in a counterclockwise direction as viewed in FIG. 2. A series of essentially identical particle lifting flights 32 are equally spaced around the inside surface of drum 12, and project generally inwardly toward the center of the drum. Flights 32 extend longitudinally substantially the entire length of the drum. As flights 32 move through bed 24, they scoop solid sulphur particles from the bed and raise the particles to the upper portion of drum 12. The flights are generally flat so that each flight will have dropped essentially all of the particles it is carrying by the time the flight has moved a short distance past the highest point in drum 12. This produces a concentrated shower of falling particles in the right hand quadrants I and II of drum 12, as seen in FIG. 3, with a much smaller number of particles falling into the left hand quadrant III near the vertical center line of the drum.

Drum 12 has means located within it for deflecting the shower of falling solid sulphur particles into two separated distinct, relatively thin, continuous curtains 36 and 38 of solid sulphur particles. An upper elongated deflector pan 40 extending lengthwise of drum 12 is located in the upper portions of quadrants II and III adjacent the vertical center line of the drum, as viewed in a plane perpendicular to the axis of the drum, which contains the highest ascending flights 32. A lower elongated deflector pan 42 extending lengthwise of drum 12 is located near the center of the drum, with a major portion of the pan 42 being located in a lower portion of quadrant II of the drum, when viewed in a plane perpendicular to the axis of the drum, which contain the highest ascending flights 32 in planes. Pans 40 and 42 are parallel to each other and are preferably inclined at an angle of approximately 45° to collect and direct falling particles into curtains 36 and 38.

Referring to FIG. 2, the solid sulphur particles from the flights 32 descend directly onto either pan 40 or pan 42 in their down flights back towards bed 24. The particles which are collected on upper pan 40 descend from the lower edge thereof to form the upper curtain 36, which in turn is received on lower pan 42. The particles from curtain 36 mix with the particles descending directly onto pan 42 and descend together from the lower edge thereof, to form the lower curtain 38, which in turn is directed towards bed 24. Thus, substantially all of the particles from bed 24 which are lifted by flights 32 are ultimately deflected by pan 42 and descend back into bed 24 in curtain 38.

A pair of liquid sulphur headers 44 and 46, supported one above the other, having a series of sulphur spray nozzles 48 spaced therealong, extend longitudinally of drum 12 beneath deflector pan 42. Referring to FIG. 4, the headers 44 and 46 are suitably received in steam jackets 49 of well known construction. Nozzles 48 are generally aligned horizontally in the direction of movement of the particles in bed 24, and spray atomized liquid sulphur at a pressure preferably in the range of about 200 to 260 p.s.i. and at a temperature preferably in the range of about 275° to 305° F. onto the curtain 38 of falling solid sulphur particles. The angle of the sulphur spray pattern and the distance of the spray nozzles from the curtain 38 will be hereinbelow discussed in further detail. Since the solid sulphur particles in bed 24 increase in average size as they migrate from the feed end 16 to discharge end 18, the amount of liquid sulphur particles sprayed into curtain 38 may be increased in the direction of particle migration. This can be accomplished by increasing the pressure at the nozzles 48 from the feed end 16 to the discharge end 18, or by increasing the effective flow area of the nozzles 48 from the feed end 16 to discharge end 18. The stationary portions of system 10 are supported in a suitable manner.

In order to maintain and control the temperature of the solid sulphur particles in the drum 12, atomized water in the form of a fine mist spray is injected into drum 12. As the water mist evaporates into the air moving through the drum, the heat of vaporization removes the heat of fusion of the liquid sulphur which is solidifying in the drum. Reference is made to U.S. Pat. No. 4,213,924 for a discussion of the use of atomized water as a means to control the temperature of the solid particles within a granulation drum. Referring to FIGS. 1 and 2, a series of longitudinally spaced spray nozzles 50 and 52 extend substantially the entire length of the drum within quadrants III and IV. The spray patterns from nozzles 50 and 52 should preferably be a wide angle round spray pattern. Examples of spray nozzles contemplated for use in conjunction with the present are Spraying System Co. atomizing nozzles fine spray nozzles #LN12, LN18 and LN26. The water is atomized in a section of the drum 12 which is substantially free from falling solid sulphur particles such that the water is allowed to quickly evaporate into the drum's atmosphere without directly contacting the solid sulphur particles. As will hereinbelow become more apparent, the temperature of the solid sulphur particles in various portions of the drum 12 may be suitably controlled by controlling the volume of atomized water sprayed in these portions through the nozzles 50 and 52 located in such portions of the drum.

In order to increase the product capacity of the system, a plurality of propeller type fans 54 are suitably supported within the drum along the length thereof in facing relationship and behind the curtain 36. Fans 54 spray humidified air directly onto the solid sulphur particles in the curtain 36 to reduce and control the temperature of the particles. It should be noted that the fans 54 are mounted in secions of the drum 12 not subject to falling sulphur particles and, to prevent excessive moisture contact with the blades, they are mounted out of the section of the drum where water is atomized. It is preferred that the fans be able to recycle approximately five times the volume of air which is pulled through the drum 12.

The temperature of the bed 24 may be maintained in the manner as discussed above in the range of 110° to 170° F. It has been found that at these temperature ranges a quality pellet product results from solidification of the liquid sulphur sprayed onto the solid sulphur particles.

As alluded to above, the full sized sulphur pellets that do not pass through the screen at the discharge end 18 of the drum 12 are not returned to the drum and must therefore be replaced with seed nuclei particles to keep the system operating continuously. In the past such seed nuclei were created in a crusher and directed into the feed end 16 of the drum 12. Alternatively, or in conjunction therewith, in U.S. Pat. No. 4,272,234 a method is disclosed to produce the seed nuclei in the drum by intermittently raising the temperature of the bed to the range of about 160°–220° F. In so doing, the liquid sulphur sprayed on the falling solid sulphur particles does not completely solidify immediately, thereby as the particles are tumbled in the bed an abrading action of the particles rubs or breaks off small pieces of the soft coating which form the seed nuclei.

The present invention is specifically directed to the generation of seed nuclei in the drum 12 on a continuous basis. Briefly stated, it has been discovered that by increasing the temperature of the solid sulphur particles within the drum, the water sprayed on the hot solid sulphur particles evaporates (water boiling at 212° F.) removing heat from the particles. The steam generated in this manner humidifies the air flowing through the drum. The humid air in the vicinity of the liquid sulphur spray cools the fine mist portion of the spray pattern generated by the liquid sulphur spray nozzles and sulphur seed nuclei drop out. By controlling the location of the water spraying and the water quantity, and the solid sulphur bed temperature, the location and magnitude of seed nuclei generation may be controlled.

The flat jet spray nozzle 48, as disclosed hereinabove, has a spray pattern as illustrated generally in FIG. 4. As depicted in FIG. 4, there are two distinct areas in the spray pattern, one in the center core designated as Area A, which contains a maximum population or high density of liquid sulphur spray particles, and the other on the outskirt or periphery designated as Area B, which contains a minimum population or low density of liquid sulphur spray particles. As will hereinbelow become more apparent, the liquid sulphur particles in Area B form the seed nuclei and the liquid sulphur particles in Area A coat the solid sulphur particles in curtain 38. The relative size of Areas A and B may be controlled by changing one or a combination of various parameters.

Referring to FIG. 4, wherein the distance from the spray nozzle 48 to the curtain 38 is indicated at Z, at such distance Z a large percentage of the total area of the spray pattern impacting on the curtain 38 has a maximum or high density of liquid sulphur particles (Area A) and a small percentage of the total area of the spray pattern has a minimum or low density of liquid sulphur particles (Area B). At a distance indicated at Y from the nozzle 48, the Area B is eliminated and the total area of the spray pattern has a maximum or high density of liquid sulphur particles (Area A). An extreme case would be when the curtain 38 is moved to an infinite distance from the nozzle 48 wherein the total area of the spray pattern has a minimum or low density of liquid sulphur particles (Area B). Accordingly, it should be appreciated that by varying the distance between the spray nozzle 48 and the curtain 38 the relative size of the Areas A and B in the spray pattern may be controlled.

The size of the Areas A and B in the spray pattern may also be controlled by changing the angle of spray (C) of the spray pattern. An increase in the angle of spray C increases the Area B and decreases the Area A. Also, an increase in the liquid sulphur particle quantity and the spraying pressure will increase the Area A and decrease the Area B. It is presently preferred that the angle of spray (c) be in the range of 80° to 110°, and more preferrably in the range of 90° to 100°.

As stated above, by maintaining the temperature of the solid sulphur particles in the bed 24 high enough to evaporate the water instantaneously on contact with the solid sulphur particles, particles with no moisture film are made available for the liquid sulphur spray in the mainstream of the Area A of the spray pattern. The evaporated water, now steam, cools the surrounding air because of humidification. The minute particles of liquid sulphur spray in Area B of the spray pattern, and the surrounding area, contact the surrounding cool air, which is maintained at temperatures far less than the 245° F., the freezing point of sulphur, to cool the minute liquid sulphur particles to the solid state. These solid sulphur particles are sufficiently large, so as not to be carried away by the process air, and drop onto the bed 24 as seed nuclei. As the particle population or density decreases, the particles become more susceptible to fast cooling and increase seed generation.

It has been discovered that various operational criteria and parameters within the drum 12 are preferred to produce seed nuclei on a continuous basis as discussed above. These operational criteria and parameters are a function of the quantity of seed nuclei required to be generated, which in turn is a function of the production rate of the system and the size range of the product.

In accordance with a presently preferred embodiment of the invention, a system 10 constructed as hereinabove discussed is able to generate seed nuclei within the drum 12 on a continuous basis upon operation in accordance with the following operational criteria and parameters. The system 10 is designed to produce at between 20 to 25 MTPH production rates. The sulphur spray nozzles 48 are unijet nozzles with flat spray tips #6508 and #6510 as manufactured by the Spraying System Co. The temperature of the solid sulphur particles in the portion of the drum in which seed nuclei is generated is maintained in the range of about 180° to 230° F., and preferably in the range of 190° to 210° F. The temperature of the liquid sulphur particles leaving the spray nozzles 48 is preferably in the range of 275° to 305° F. and the pressure is preferably in the range of 200 to 260 PSI. The distance from the spray nozzles 48 to the curtain 38 (Z) is preferably in the range of 6 to 8 inches. Air flow through the drum 12 varies between 2000 to 12000 CFM depending upon the ambient air temperatures. The atomized water spray nozzles 50 and 52 used for humidification are preferably atomizing fine spray nozzles #LN12, or LN14, or LN18, or LN26, as manufactured by the Spraying Systems Co. The humifidification water flow rates through the nozzles 50 and 52 are preferably at flow rates between 1 and 5 GPM depending upon the production rates, liquid sulphur temperature and ambient air temperature and process air volumes. The process exit air temperature is maintained in the range of 120° to 140° F. and the temperature of the discharge solid sulphur particles is maintained at approximately 160° F.

The specific operating criteria and parameters are selected by experimentation to meet various changing operational parameters. For example, in order to meet a change in production rates of the system, it may be necessary to increase or decrease the continuous seed nuclei generation requirements of the system. This can be achieved by changing one or a combination of the following variables at a given rate and/or time:

(1) air flow rates and flow pattern inside the drum 12;

(2) the quantity, temperature, and pressure of the liquid sulphur particles;

(3) the spraying distance between the liquid sulphur spray nozzles 48 and the curtain 38 (Z);

(4) the quantity, location, temperature and degree of atomization of the humidification water sprayed from nozzles 50 and 52;

(5) the type and size of the liquid sulphur spray nozzles 48 and water spray nozzles 50 and 52; and (6) the sulphur pellet product size range.

In accordance with a further form of the invention it is preferred that the seed nuclei be generated in an area of the drum 12 close to the feed end 16. In so doing, the generated seed nuclei has sufficient drum length to be coated with liquid sulphur particles as it moves towards the discharge end 18. It is possible that, by controlling the generation of the required quantity of seed nuclei close to the inlet end 16 of the drum 12, the system can generate the seed nuclei in the drum and the growth to product size particles may be accomplished in a single pass through the system. To this end, the operational criteria discussed above to increase seed nuclei generation would be maximized at the inlet end of the drum and the criteria necessary to increase particle growth rate would be maximized over the remaining length of the drum. For example, the temperature of the solid sulphur particles in bed 24 close to the inlet end of the drum would be maintained in the range of 180° to 230° F. and the spray pattern of liquid sulphur from nozzles 48 would be designed to increase the Area B. Further, over the remaining portion of the drum, the temperature of the solid sulphur particles in bed 24 would be maintained in the range of 110° to 170° F. and the spray pattern of liquid sulphur from nozzles 48 would be designed to increase the Area A, and thereby maximize particle growth.

In summary, it has been discovered that the nuclei seed nuclei can be continuously generated in an area of the drum by increasing the temperature of the bed of solid sulphur particles in such area in the range of about 180° to 230° F., and preferably 190° to 210° F. The temperature is controlled and maintained in this range by the spray of atomized liquid (water) into such area of the drum. The water spray nozzles may be individually controlled, allowing the control of the temperature profile within the drum. The water, when sprayed on the hot solid sulphur particles, evaporates and removes heat from the particles. The steam generated in this way humidifies the air flowing through the drum. This humid air in the vicinity of the liquid sulphur spray patterns cools the fine mist generated by the liquid sulphur nozzles (Area B) and solid seed nuclei drop out. As hereinabove discussed, by controlling the location of the water spray nozzles and the quantity of water sprayed, the temperature of the solid sulphur particle bed can be controlled. This unique method of seed nuclei generation continuously within the drum has enabled the control of one of the major variables in the sulphur pelletizing process and has enabled the reduction and/or elimination of the crusher as the primary souce of seed nuclei supply to the process. Further, the seed nuclei so produced is of improved shape and results in spherical product size sulphur pellets.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A method of continuously generating sulphur seed particles within a rotating drum that are capable of having their size increased to form sulphur pellets larger than predetermined size, comprising the steps of:
   (a) forming an elongated bed of solid sulphur particles of various sizes;
   (b) rotating said bed within a rotating drum;
   (c) continuously elevating said solid sulphur particles from said bed in said drum;
   (d) dropping the elevated particles in a generally continuous curtain of solid sulphur particles which fall back into said bed;
   (e) spraying liquid sulphur particles onto said curtain of falling solid sulphur particles to coat and increase the size of said falling solid sulphur particles; and
   (f) continuously controlling the temperature of a predetermined portion of said bed in the range of about 180° to 230° F., whereby a predetermined first portion of the liquid sulphur particles are solidified into sulphur seed particles and drop out prior to contacting said curtain of falling solid sulphur particles.

2. The method as defined in claim 1 wherein the temperature of the first portion of said bed defined in step (f) is in the range of about 190° to 210° F.

3. The method as defined in claim 1 wherein the temperature of a second portion of the bed is in the range of about 110° to 170° F.

4. The method as defined in claim 1 wherein the temperature of the bed is maintained by controlling the spray of an atomized cooling liquid within said drum.

5. The method as defined in claim 1 wherein the quantity of sulphur seed particles generated in step (f) is controlled by increasing or decreasing the size of the predetermined portion of said bed defined in step (f).

6. The method as defined in claim 1 wherein the liquid sulphur particles defined in step (e) travel a distance in the range of about 6 to 8 inches before reaching said curtain of falling solid sulphur particles.

7. The method as defined in claim 1 wherein the quantity of sulphur seed particles generated in step (f) is controlled by increasing or decreasing the angle of the spray pattern of said liquid sulphur particles defined in step (e).

8. The method as defined in claim 1 wherein the temperature of the liquid sulphur particles defined in step (e) is in the range of about 275°–305° F.

9. The method as defined in claim 8 wherein the quantity of sulphur seed particles generated in step (f) is controlled by increasing or decreasing the temperature of said liquid sulphur particles defined in step (e).

10. The method as defined in claim 1 wherein the spraying pressure of the liquid sulphur particles defined in step (e) is in the range of about 200 to 260 PSI.

11. The method as defined in claim 10 wherein the quantity of sulphur seed particles generated in step (f) is controlled by increasing or decreasing the spraying pressure of said liquid sulphur particles defined in step (e).

12. The method as defined in claim 6 wherein the quantity of sulphur seed particles generated in step (f) is controlled by increasing or decreasing the distance the liquid sulphur particles travel before reaching said curtain of falling solid sulphur particles.

13. The method as defined in claim 1 further including the step of flowing ambient air through said rotating drum.

14. The method as defined in claim 13 wherein the flow rate of ambient air through said drum is in the range of about 2000 to 12000 CFM dependent upon the ambient air temperatures.

15. The method as defined in claim 1 wherein said first predetermined portion of said bed defined in step (f) is located adjacent the feed end of said rotating drum.

16. Apparatus for producing solid sulphur pellets in a rotating drum from sulphur seed particles continuously generated in the rotating drum, comprising:
   (a) an elongated, generally cylindrical, rotating drum having its axis of rotation inclined slightly with respect to the horizontal from a feed end to a discharge end, whereby rotation of said drum causes solid sulphur particles forming a bed therein to move from said feed end toward said discharge end;
   (b) a plurality of particle lifting flights extending from the inside surface of said drum generally toward its center axis, whereby rotation of said drum causes said flights to lift solid sulphur particles from said bed to an upper zone in said drum and to then drop said solid sulphur particles so that a curtain of said solid sulphur particles fall toward said bed;
   (c) a series of spaced nozzles generally aligned horizontally in the direction of movement of said solid sulphur particles in said bed for spraying liquid sulphur particles into said falling curtain of solid sulphur particles;
   (d) first means for controlling the temperature of a first predetermined portion of said bed, whereby said liquid sulphur particles coat and increase the size of the solid sulphur particles in said falling curtain of solid sulphur particles; and (e) second means for continuously controlling the temperature of a second predetermined portion of said bed in the range of about 180°–230° F., whereby a predetermined portion of the liquid sulphur particles is continuously solidified into sulphur seed particles and drop out prior to contacting said falling curtain of solid sulphur particles.

17. The apparatus as defined in claim 16 wherein said first means controls the temperature of said first predetermined portion of said bed in the range of about 110° to 170° F.

18. The apparatus as defined in claim 16 wherein said second means controls the temperature of said second predetermined portion of said bed in the range of about 190° to 210° F.

19. The apparatus as defined in claim 16 wherein said first means includes a series of nozzles for spraying an atomized liquid onto said first predetermined portion of said bed.

20. The apparatus as defined in claim 16 wherein said second means includes a series of nozzles for spraying an atomized liquid onto said second predetermined portion of said bed.

21. The apparatus as defined in claim 17 further including fan means for flowing ambient air into and through said drum.

22. The apparatus as defined in claim 21 wherein said fan means includes a plurality of longitudinally spaced fans positioned within said drum at an elevation above said liquid sulphur spray nozzles for directing humidified air toward said falling curtain of solid sulphur particles.

* * * * *